Patented Apr. 15, 1952

2,593,099

UNITED STATES PATENT OFFICE 2,593,099

MAGNESIUM OXIDE-BARIUM OXIDE SILVER CATALYST SUPPORT AND PROCESS USING THE SAME

George Calingaert, Geneva, N. Y., assignor to Ethyl Corporation, New York, N. Y., a corporation of Delaware No Drawing. Application December 9, 1950, Serial No. 200,126

4 Claims. (Cl. 260—348.5)

This invention relates to a support for a catalyst useful in the oxidation of olefins. In particular my invention relates to a catalyst support for the oxidation of ethylene to ethylene oxide. My invention is also directed to a process for the oxidation of ethylene using silver deposited on such support.

Ethylene oxide is an important chemical intermediate, being employed commercially in many processes. For example, acrylonitrile can be manufactured by treating ethylene oxide with hydrogen cyanide. Hydrolysis of ethylene oxide to ethylene glycol results in an important antifreeze compound. Likewise, from ethylene glycol can be prepared glycol dinitrate for dynamite. Furthermore, ethanolamines, resins, polymers, aldehydes and glycol ethers can be manufactured from ethylene oxide. By treating the oxide with alkyl phenols important detergents can be manufactured, etc. Finally, ethylene oxide finds commercial use itself as a solvent and fumigant.

It is well known that silver catalyzes the oxidation of ethylene, by means of air or oxygen, to ethylene oxide. Of the many catalysts proposed for this reaction, only silver has been proved in practice to possess sufficient activity and selectivity to merit consideration in a commercial operation. However, for successful commercial operation such catalyst must remain active over long periods of use, must be insensitive to changes of temperature, and must be relatively insensitive to impurities present in the reactants. Silver metal, used alone, fails to satisfy these requirements. In addition, the conversion of ethylene to ethylene oxide must be high and the formation of byproducts, or products of competing reactions must be minimized in order that the manufacturing process be economically attractive. Silver alone produces extremely small yields of ethylene oxide and uneconomically high yields of acetaldehyde, carbon dioxide and water.

Various means have been proposed to overcome these disadvantages, such as incorporating an inert material with the silver, with limited success. Most of these expedients produce a catalyst which suffers from one or more of the disadvantages inherent in the silver alone. In addition, control of the reaction, because of poor heat transfer of the supported catalyst makes the reaction temperature more difficult to control, resulting in an increased proportion of undesirable products, or requiring complicated reactors with internal cooling facilities. To be commercially acceptable it is preferred that a catalyst be supported on a material which can be utilized in a fluidized condition. Many supports which can be utilized in a thermally inefficient fixed-bed reactor cannot be satisfactorily fluidized, and agglomerate, channel, or "slug" when fluidized operation is attempted. Furthermore, a catalyst for the oxidation must attain its maximum activity within a reasonable period of operation.

It is, accordingly, an object of this invention to provide a support material for silver such that ethylene oxide can be produced by the direct oxidation of ethylene in its presence and an improved yield obtained thereby. An additional object is to provide a supported silver catalyst which retains maximum activity over long periods, to produce a high yield of ethylene oxide over a broad range of temperatures, and is not destroyed by accidental exposure to abnormally high temperature. It is a further object of this invention to provide a catalyst support for the manufacture of ethylene oxide whereby the activity of the catalyst reaches a maximum after a short period of operation. As a still further object, a means is provided for preparing a supported silver catalyst which can be utilized in a process employing fluidized technique to obtain proper control of the exothermic reaction, and minimize the side and secondary reactions. Other objects of this invention will appear from the further description hereafter.

I obtain the advantages of my invention by incorporating silver with a refractory material comprising magnesium oxide and barium oxide. More particularly my invention comprises a crushed refractory material having a composition which can be expressed as 10 to 20 per cent barium oxide and 70 to 85 per cent magnesium oxide, the balance if any, being inert inorganic oxides. The conventional amount of silver is deposited on my support, namely 2 to 50 per cent with the best results being obtained between 4 and 20 per cent.

The temperature of reaction for the process of this invention is between 150° and 400° C. although the normal preferred range is between 250° and 300° C. An important advantage of the supports of this invention is that they stand up well at temperatures above 300° C. Frequently due to poisoning, the silver catalyst loses its activity but the activity can be restored when the temperature is increased above 300° C. Also misoperation may result in a high temperature which must be withstood by the support. The supports of the prior art are deficient in this respect.

It is also important that the catalytic activity of the support reach a maximum after a short period of operation, in order to increase its usefulness. The supports of this invention are excellent in this respect.

The reaction between ethylene and oxygen proceeds at either atmospheric, subatmospheric or superatmospheric pressures. The proportion of ethylene and oxygen or air (or other oxygen-containing gas) while not critical should preferably be between 1:5 and 1:20 parts of ethylene to air.

The silver catalyst on our supports used in carrying out the reaction can be disposed in the reaction vessel in any manner provided the necessary contact time is provided, which is preferably between 5 and 30 minutes. However, one advantage of the catalyst support of this invention is that it can be readily fluidized. Many supports are difficult and even impossible to fluidize.

In order to best fluidize the catalyst and support the catalyst particles should not be all the same size and it is important that a certain percentage should be small in order to provide a lubricating effect. For best results in a fluid operation the particle size mixture should have 40 to 60 parts between 100- and 200-mesh, 30 to 40 parts between 200- and 325-mesh, and 10 to 20 parts smaller than 325-mesh.

Silver catalyst supports previously used had no catalytic effect and to obtain a high conversion of ethylene to ethylene oxide various promoters have been suggested. My support has a definite catalytic effect. One of the best promoters is barium peroxide ($BaO_2$). Although some promoters may be helpful to my support, none is needed and actually the use of barium peroxide with my support is harmful because it increases the consumption of ethylene while decreasing the production of ethylene oxide.

The support and catalyst may be prepared and used in any suitable manner as that generally described in the article by McBee, Hass, and Wiseman, Industrial and Engineering Chemistry, 37, 432 (1945). However, since it is preferred to use the catalyst in a fluidized operation the procedure best suited for such operation will be described. However, my invention is not limited to a fluidized operation.

The support material to be tested is first mixed in the proper proportion and then sized by screening with standard screens of 100-, 200-, and 325-mesh. The different particle sizes falling within the above mesh sizes are then mixed with silver oxide and distilled water thereby forming a slurry. The slurry is heated while agitating to a temperature of about 120° C. until the catalyst is thoroughly dried. After such drying, each size of catalyst is rescreened and the desired portions of each size are mixed and the catalyst is ready for use in the fluidized reactor.

The invention can be best understood by referring to the following working examples.

Example I

A fused brick composed of 10 per cent barium oxide, 82.5 per cent magnesium oxide, 6 per cent silicon dioxide and 1.5 per cent ferric oxide was crushed, ground and prepared as above. The final silver content was 6.7 per cent and the mixture comprised 52 parts between 100- and 200-mesh, 34 parts between 200- and 325-mesh, and 14 parts smaller than 325-mesh.

The catalyst was fluidized with air and ethylene oxide and the reacting materials passed through a reactor at a temperature of 260° C. and at atmospheric pressure for a run lasting 433 hours. The reactor contained 100 parts of catalyst. The ratio of air to ethylene was 10 to 1. The reaction products were removed from the catalyst and analyzed, the catalyst remaining in the system. The average amount of ethylene reacted was 60.6 per cent and the conversion to ethylene oxide was 37.2 per cent.

Example II

In an operation identical to the above except that periodically the temperature was raised to 315° C. for periods of 42 hours, the conversion after the temperature was returned to 260° C. was always good and in the neighborhood of 37 per cent. Thus my support is unaffected by sudden and substantial temperature increases.

Example III

In another operation similar to Example I except that the amount of silver was increased to 10.7 and the catalyst size was 56 parts between 100- and 200-mesh, 29 parts between 200- and 325-mesh and 15 parts smaller than 325-mesh, the ethylene disappearance was 79.9 per cent and the conversion to ethylene oxide was 42.8 per cent. During this test the temperature was frequently raised to 310° C. for periods of 24 hours and the effectiveness of the catalyst was not impaired by the high temperature operation.

Example IV

In another operation similar to Example I, except that the support was modified within the scope of my invention, similar but somewhat smaller yields were obtained. The support comprised 74 per cent magnesium oxide, 20 per cent barium oxide, 5 per cent silicon dioxide, and 1.0 per cent iron oxide. The final catalyst mixture contained 12 per cent silver and was composed of 50 parts between 100- and 200-mesh, 35 parts between 200- and 325-mesh, and 15 parts smaller than 325-mesh. The conversion was still good but less than in Example I. Percentages of barium oxide above 20 per cent are to be avoided because of the detrimental effect on the yield.

In all of the examples the catalyst reached its maximum activity in a short period of time, less than 24 hours, it fluidized readily, good conversions were obtained, and the activity of the catalyst did not decrease with continued use nor with increases in temperature.

Example V

To show the adverse effect of the barium peroxide ($BaO_2$) promoter, an operation similar to Example I was conducted except that to the catalyst and support was added 2.0 per cent of $BaO_2$. In this test the ethylene reacted was high, namely 80.1 per cent, and the conversion to ethylene oxide was low, namely 30.9 per cent. Furthermore, when the temperature was increased to 310° C. and then returned to 260° C. the conversion of ethylene oxide decreased to 26.1 per cent. Thus the use of the $BaO_2$ promoter gives poorer yields and causes the catalyst to lose activity at higher temperatures.

The above examples are merely illustrative of my invention and other modifications will be readily apparent to those skilled in the art.

I claim:

1. In an oxidation catalyst containing silver, the improvement comprising a refractory support for said silver, consisting essentially of from 10 to 20 per cent barium oxide and 70 to 85 per cent magnesium oxide, the balance being incidental impurities.

2. The catalyst of claim 1 in which the particle size of said catalyst comprises 40 to 60 parts between 100- and 200-mesh, 30 to 40 parts between 200- and 300-mesh, and 10 to 20 parts less than 325-mesh.

3. In an oxidation process using silver as the catalyst, the improvement comprising using a catalyst support consisting essentially of 10 to 20 per cent barium oxide and 70 to 85 per cent magnesium oxide, said process conducted at a temperature between 150° and 400° C., at a contact time between 5 and 30 minutes and an ethylene to air ratio between 1:5 and 1:2.

4. A process for producing ethylene oxide comprising reacting ethylene with oxygen in the presence of a catalyst comprising silver and a support therefor, said support consisting essentially of 10 to 20 per cent barium oxide and 70 to 85 per cent magnesium oxide, the particle size of said catalyst comprising 40 to 60 parts between 100- and 200-mesh, 30 to 40 parts between 200- and 300-mesh, and 10 to 20 parts less than 325-mesh, said process conducted at a temperature between 150° and 400° C., at a contact time between 5 and 30 minutes and an ethylene to air ratio between 1:5 and 1:2.

GEORGE CALINGAERT.

REFERENCES CITED

The following references are of record in the file of this patent:

UNITED STATES PATENTS

| Number | Name | Date |
| --- | --- | --- |
| 2,238,474 | McNamee et al. | Apr. 15, 1941 |

FOREIGN PATENTS

| Number | Country | Date |
| --- | --- | --- |
| 587,584 | Great Britain | Apr. 30, 1947 |